United States Patent [19]

Numata

[11] 4,048,644
[45] Sept. 13, 1977

[54] WARNING DEVICE FOR A CAMERA

[75] Inventor: Saburō Numata, Omiya, Japan

[73] Assignee: Fuji Photo Optical Co., Ltd., Omiya, Japan

[21] Appl. No.: 667,073

[22] Filed: Mar. 15, 1976

[30] Foreign Application Priority Data

Apr. 28, 1975 Japan .................................. 50-51837

[51] Int. Cl.² .......................... G03B 7/00; G03B 17/20
[52] U.S. Cl. .............................. 354/60 L; 354/23 D; 354/53; 354/60 A
[58] Field of Search ...................... 354/23 D, 53, 60 L, 354/60 A

[56] References Cited

U.S. PATENT DOCUMENTS

| | | | |
|---|---|---|---|
| 3,956,758 | 5/1976 | Numata et al. ........................ | 354/53 |
| 3,967,288 | 6/1976 | Yamamoto .............................. | 354/53 |

Primary Examiner—Russell E. Adams
Attorney, Agent, or Firm—Haseltine, Lake & Waters

[57] ABSTRACT

The warning device for a camera has an operation circuit for determining proper exposure condition of the shutter time according to the informations of the brightness of the object, the diaphragm aperture of the objective and the film sensitivity, a manually operable circuit for manually setting the condition of the shutter time and an optical indicating circuit operated by the manually operable circuit for digitally indicating the condition of the shutter time set by the manually operable circuit.

The warning device is provided with a comparison circuit with its one input connected to the output of said operation circuit and with its other input connected to the manually operable circuit, and an oscillator with its input connected to the output of the comparison circuit and with its output connected to the optical indicating circuit so as to cause winking of the optical indication of the optical indicating circuit, the duty ratio of pulses of the oscillator being varied depending upon the output of the comparison circuit so as to render the duty ratio to be increased to 1 as the output of the manually operable circuit reaches that of the operation circuit so that the degree of non-coincidence of the outputs of the operation circuit and the manually operable circuit is easily found out while continuous optical indication of the proper exposure condition of the camera is achieved.

3 Claims, 1 Drawing Figure

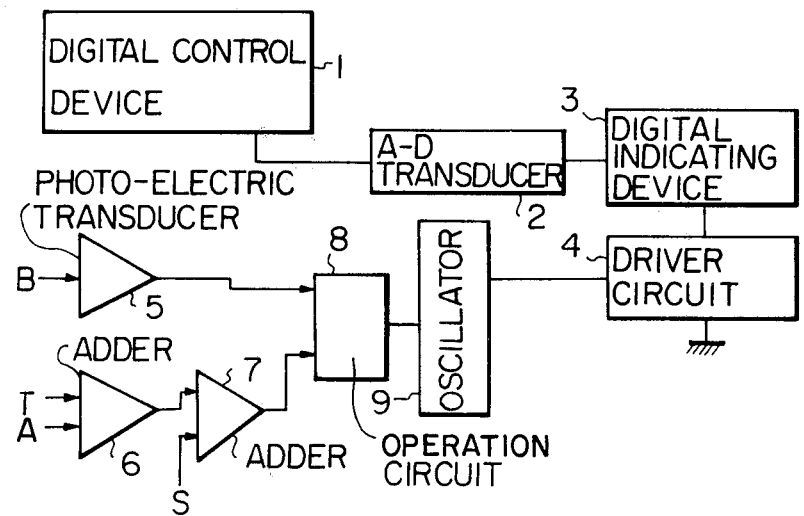

WARNING DEVICE FOR A CAMERA

BACKGROUND OF THE INVENTION

The present invention relates to a warning device for a camera.

It relates more particularly to a warning device adapted to be used in a camera provided with a digital indicating device of the shutter time manually set in the camera wherein winking of the optical indication of the digital indicating device is effected when the shutter time manually set in the camera does not coincide with that determined by an operation circuit provided in the camera on the basis of the informations of the brightness of the object, the diaphragm aperture of the objective and the sensitivity of the film loaded in the camera, while the winking of the optical indication is stopped to provide continuous optical indication when the manually set shutter time coincides with that determined by the operation circuit for indicating proper exposure condition, the duty ratio of the winking of the optical indication being increased to 1 as the manually set shutter time reaches that determined by the operation circuit while the duty ratio is decreased as the difference between the manually set shutter time and that determined by the operation circuit increases thereby permitting the degree of non-coincidence of the both to be easily found.

Various types of cameras have been recently proposed which are provided with digital indicating device for optically and digitally indicating informations relating exposure such as the proper shutter time obtained by the informations of the brightness of the object, the diaphragm aperture of the objective of the camera and the sensitivity of the film a preset shutter time, the diaphragm aperture, or the exposure multiplication factor. Further, it has been proposed to utilize photo diodes in the digital indicating device so that warning against false exposure is provided by lighting and extinguishing the photo diodes. However, the prior art warning devices of the type described above issue warning by lighting or extinguishing the photo diodes only when the exposure condition as set is inappropriate so that false exposure might be caused, thereby resulting in poor effectiveness of the warning.

SUMMARY OF THE INVENTION

The object of the present invention is to provide a novel and useful warning device for a camera which avoids the above described disadvantages of the prior art warning devices.

In accordance with the present invention, a warning device is proposed which comprises a comparison circuit in which the output of an operating circuit determining proper exposure information such as shutter time according to the informations of the brightness of the object, exposure information such as the diaphragm aperture of the objective of the camera and the sensitivity of the film loaded in the camera is compared with the output of a manually operable circuit indicative of the shutter time manually set in the manually operable circuit so that the output is generated the amount of which increases as the difference between the outputs of the operation circuit and the manually operable circuit increases while the output is rendered to be low level or zero when the two outputs coincide with each other, and the output of the comparison circuit is applied to an oscillator connected to a driver circuit of the digital indicating circuit so that winking of the optical indication is caused by the pulses of the oscillator when the outputs of the operation circuit and the manually operable circuit do not coincide with each other while the winking is stopped when the two outputs coincide with each other to indicate the proper exposure condition, the duty ratio of the pulses of the oscillator causing the winking of the optical indication being rendered to approach 1 as the output of the manually operable circuit reaches the output of the operation circuit whereas the duty ratio is decreased as the difference between the outputs of the operation circuit and the manually operable circuit increases thereby permitting the degree of non-coincidence of the two outputs to be easily found out.

BRIEF DESCRIPTION OF THE DRAWING

The accompanying drawing is a block diagram showing an embodiment of the electric circuit of the warning device of the present invention.

DETAILED DESCRIPTION OF THE PREFERRED EMBODIMENT

Referring to the accompanying drawing, a photoelectric transducer 5 receives the information of the brightness of the object to issue an electric signal representing the scene brightness. An adder 6 receives the exposure informations such as the manually set shutter time T and the diaphragm aperture A of the objective of the camera so as to issue an electric signal representing the conditions of the set exposure information such as shutter time T and the diaphragm aperture A. Another adder 7 receives the electric signal from the adder 6 as well as the information of the sensitivity S of the film so that the adder 7 issues an electric signal representing exposure information such as the set shutter time T, the diaphragm aperture A and the film sensitivity S. The output of the transducer 5 and the output of the adder 7 are supplied to a comparison circuit or an operation circuit 8 the output of which is applied to an oscillator 9 so as to modulate the time constant of RC circuit in the oscillator 9 depending upon the condition of the output of the comparison circuit 8 which is actuated by the transducer 5 and the adder 7.

The output of the oscillator 9 is applied to a driver circuit 4 connected to a digital indicating device so as to actuate the same.

The digital indicating device 3 is connected to a digital control device 1 through an A-D transducer 2 so that the digital indicating device 3 digitally indicates exposure information such as the set shutter time T by the operation of the digital control device 1 which controls the shutter time of the camera.

In operation, when the automatic exposure control camera provided with the digital control device 1 is used with exposure meter coupled therewith and when the output of the transducer 5 does not coincide with that of the adder 7, the output of the comparison circuit 8 is made high level and the value of the high level increases as the difference between the outputs of the transducer 5 and the adder 7 increases and the differential output of the comparison circuit 8 causes variation in the time constant of RC circuit in the oscillator 9 so that the duty ratio of pulses of the oscillator 9 is varied.

Since the output of the oscillator 9 actuates the driver circuit 4, winking of the digital indication of exposure information such as the shutter time in the digital indicating device 3 is caused by the driver circuit 4 and the duty ratio of pulses or the winking of the digital indication is varied depending on the condition of the output of the comparison circuit 8.

When the outputs of the transducer 5 and the adder 7 coincides with each other during the manual adjustment of the shutter time, the output of the comparison circuit 8 is made low level and the duty ratio of pulses of the oscillator 9 is made 1, i.e., the continuous high level signal is generated by the oscillator 9 so as to continuously indicate the digital indication of the set shutter time.

On the other hand, as the difference between the outputs of the transducer 5 and the adder 7 increases, the duty ratio of pulses of the oscillator 9 is rendered to decrease, i.e., the output of the oscillator 9 approaches continuous low level.

Therefore, the degree of non-coincidence of the outputs of the transducer 5 and the adder 7, i.e., the amount of deviation of the actually set shutter time from the proper shutter time is easily indicated to facilitate the manipulation of the camera for the proper exposure.

In the above described embodiment, transducer 5 may be dispensed with, when the brightness information memorized in the memory circuit of the digital control device 1 is supplied to the comparison circuit 8.

I claim:

1. Warning device for a camera having an operation circuit for determining proper exposure condition of exposure information such as the shutter time according to the informations of the brightness of the object, the diaphragm aperture of the objective and the film sensitivity, a manually operable circuit for manually setting the condition circuit, the improvement comprising a comparison circuit having a first input connected to the output of said operation circuit and having a second input connected to said manually operable circuit, and an oscillator with input connected to the output of said comparison circuit, the output of said oscillator being connected to said optical indicating circuit so as to cause blinking of the optical indication of said optical indicating circuit when the output of said operation circuit differs from the output of said manually operable circuit, said indicating being in a lighted state when the output of said operation circuit coincides with the output of said manually operable circuit, the duty ratio of pulses of said oscillator being varied depending upon the output of said comparison circuit so as to render the duty ratio to be increased to 1 as the output of said manually operable circuit reaches that of said operation circuit; duration of the lighted interval within one blinking cycle being increased as the difference between the outputs of said operation circuit and said manually operable circuit decreases.

2. Device according to claim 1, wherein said manually operable circuit comprises a first adder in which the shutter time and the diaphragm aperture are manually set, and a second adder in which the film sensitivity is set while the output of said first adder is supplied to said second adder, the output of said second adder and the output of said operation circuit being applied to said comparison circuit, said optical indicating circuit comprising a digital indicating circuit and a driver circuit for operating said digital indicating circuit, the output of said oscillator being connected to said driver circuit.

3. A warning device for a camera as defined in claim 1 wherein said operation circuit includes light measuring means, said manually set shutter time being indicated by said indicating circuit so that said indicating circuit is in a lighted state at all times when the set shutter time coincides with the output of said light measuring means, said indicating circuit being in said blinking state when said shutter time differs from the output of said light measuring means.

* * * * *